United States Patent [19]

Takanashi et al.

[11] Patent Number: 4,855,816

[45] Date of Patent: Aug. 8, 1989

[54] COLOR IMAGING APPARATUS INCLUDING PHASE CONTROL SYSTEM FOR MAINTAINING START POSITIONS OF SCANNING LINES EQUAL TO START POSITIONS OF REFERENCE VALUES THEREOF

[75] Inventors: Itsuo Takanashi, Kamakura; Shintaro Nakagaki, Fujisawa; Hiroshi Ichimura, Tokyo; Ichiro Negishi; Masaru Osada, both of Yokosuka, all of Japan

[73] Assignee: Victor Company of Japan, Ltd., Yokohama, Japan

[21] Appl. No.: 137,926

[22] Filed: Dec. 28, 1987

Related U.S. Application Data

[63] Continuation-in-part of Ser. No. 108,988, Oct. 14, 1987, which is a continuation of Ser. No. 790,455, Oct. 23, 1985, Pat. No. 4,736,243.

[30] Foreign Application Priority Data

Dec. 26, 1986 [JP] Japan .................. 61-311670

[51] Int. Cl.⁴ .................. H04N 9/083; H04N 9/07
[52] U.S. Cl. .................. 358/47; 358/44
[58] Field of Search .............. 358/41 (U.S. only), 358/43, 44 (U.S. only), 45, 46, 47

[56] References Cited

U.S. PATENT DOCUMENTS

| | | | |
|---|---|---|---|
| 3,755,620 | 8/1973 | McMann | 358/45 |
| 3,939,486 | 2/1976 | Tomii | 358/46 |
| 4,163,250 | 7/1979 | tomii et al. | 358/45 |
| 4,185,296 | 2/1980 | Nishikawa et al. | 358/45 |
| 4,305,022 | 12/1981 | Mitamura et al. | 358/67 |
| 4,620,221 | 10/1986 | Takanashi et al. | 358/47 |
| 4,691,227 | 9/1987 | Takanashi et al. | 358/47 |
| 4,736,242 | 4/1988 | Takanashi et al. | 358/44 |
| 4,736,243 | 4/1988 | Takanashi et al. | 358/47 |

FOREIGN PATENT DOCUMENTS 53-34854  9/1978  Japan .
57-201395 12/1982 Japan .................. 358/43

Primary Examiner—James J. Groody
Assistant Examiner—Randall S. Svihla
Attorney, Agent, or Firm—Lowe, Price, LeBlanc, Becker & Shur

[57] ABSTRACT

A color filter has recurrent groups of different color stripes. An image pickup tube has a photoelectrical conversion target exposed to light passing through the color filter and an index signal generation pattern. The image pickup tube outputs a signal containing a color signal component and an index signal component which depends on the index pattern. The index signal component has a phase representing a present start position of each scanning line. A memory holds a portion of the output signal from the image pickup tube corresponding to an initial frame period which occurs under conditions where a predetermined color light is applied to the photoelectrical conversion target via the color filter. A reference signal reflects a signal read out from the memory. A color component is detected from the output signal of the image pickup tube by use of the reference signal. The reference signal contains an index signal component which has a phase representing a start position of each scannig line during the initial frame period. A closed-loop phase control system allows the present start position of each scanning line to remain essentially equal to the start position of the corresponding scanning line during the initial frame period. A phase or level shifter is interposed in a loop of the closed-loop phase control system.

4 Claims, 5 Drawing Sheets

COLOR IMAGING APPARATUS INCLUDING PHASE CONTROL SYSTEM FOR MAINTAINING START POSITIONS OF SCANNING LINES EQUAL TO START POSITIONS OF REFERENCE VALUES THEREOF

CROSS-REFERENCES TO RELATED APPLICATIONS

This is a continuation-in-part of application Ser. No. 108,988, filed on Oct. 14, 1987 which is a continuation-in-part of U.S. application Ser. No. 790,455 filed Oct. 23, 1985 now U.S. Pat. No. 4,736,243.

BACKGROUND OF THE INVENTION

This invention generally relates to a color imaging apparatus, and specifically relates to a color imaging apparatus including an image pickup tube and a striped color filter disposed in a light path to a photoelectrical conversion target of the image pickup tube to produce a luminance signal and color component signals in accordance with an industry standard television system.

Some color imaging apparatus include an image pickup tube and a striped color filter disposed in a light path to a photoelectrical conversion target of the image pickup tube. Line-by-line rectangular raster scan allows the image pickup tube to generate a color-multiplexed video signal from which given color signals are derived. For example, U.S. Pat. No. 4,620,221 discloses such a color imaging apparatus. It is important to keep the derived color signals accurate independent of changes in various factors.

SUMMARY OF THE INVENTION

It is an object of this invention to provide an accurate color imaging apparatus.

A color imaging apparatus of this invention includes an image pickup tube, a color filter, and an index signal generation pattern. The color filter has a plurality of successively arranged recurrent groups of different color stripes. The image pickup tube has a photoelectrical conversion target exposed to light passing through the color filter and the index pattern. The image pickup tube outputs a video signal containing a color signal component in the form of a carrier modulated in frequency and phase with the individual color stripes of each recurrent group of the color filter. The video signal also contains an index signal component which depends on the index pattern. The index signal component has a phase which represents a present start position of each scanning line. A memory holds a portion of the video signal which occurs under conditions where the photoelectrical conversion target was exposed via the color filter to light having a color equal to one of the colors of the stripes of the color filter. The held signal portion corresponds to scanning lines included in at least one frame period, and contains an index signal component having a phase representative of an initial start position of each scanning line which occurs under the previously-mentioned conditions. The signal portion is repeatedly read out from the memory. A first reference signal is generated in correspondence with the signal portion read out from the memory. A second reference signal is generated on the basis of the first reference signal. The second reference signal has a phase in a fixed relationship with a phase of the carrier of the video signal. A color component signal is detected from the video signal in response to the second reference signal. A closed-loop phase control system includes a device deriving a difference in phase between the index signal component of the video signal and the index signal component of the first reference signal and thereby deriving a difference between the present start position of each scanning line and the initial start position of a corresponding scanning line. The closed-loop phase control system also includes an electron beam deflection device and an adjustment device controlling the deflection device in accordance with the positional difference and thereby allowing the present start position of each scanning line to remain essentially equal to the initial start position of that scanning line. A phase shifter is interposed in a loop of the closed-loop phase control system.

BRIEF DESCRIPTION OF THE DRAWINGS

Like and corresponding elements are denoted by the same reference characters throughout the drawings.

DESCRIPTION OF THE PREFERRED EMBODIMENTS

Figure 1:
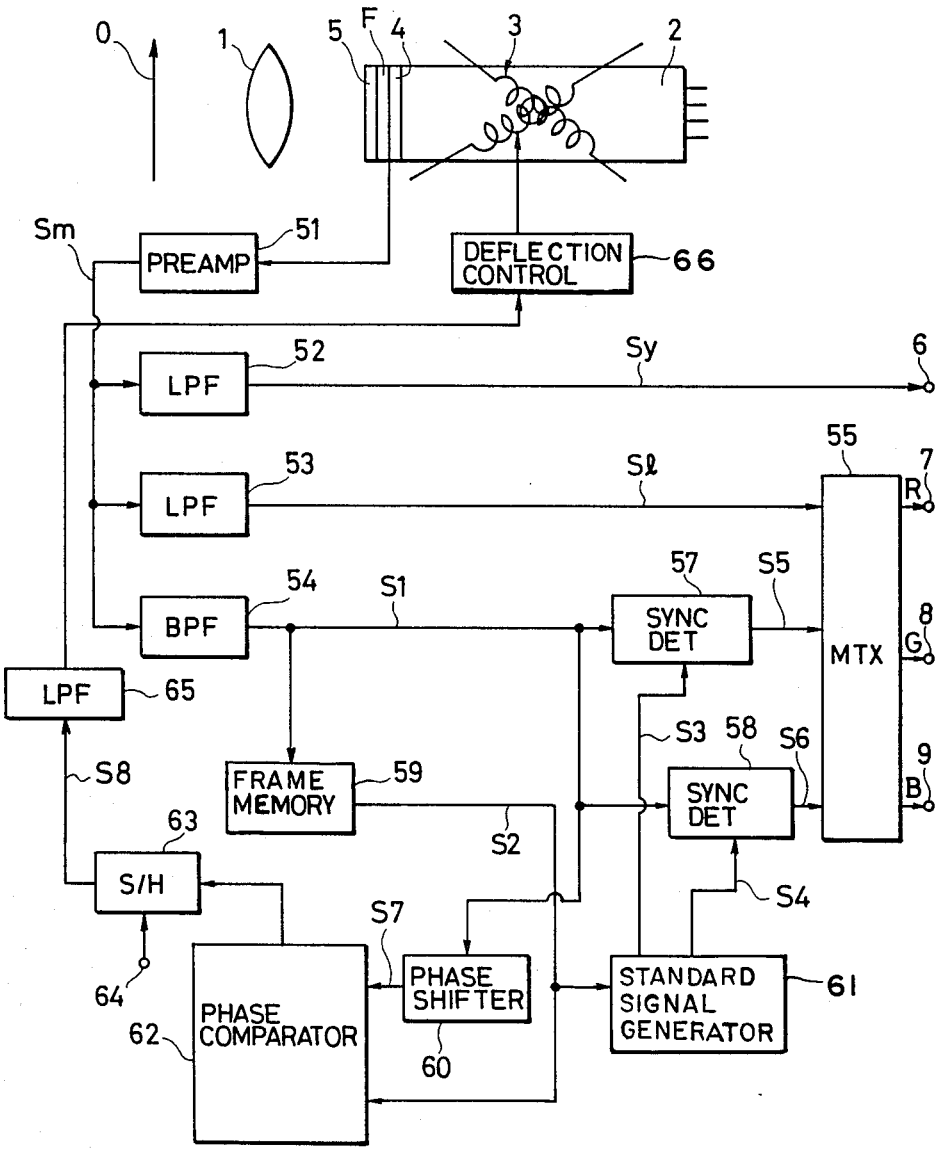
FIG. 1 is a block diagram of a color imaging apparatus according to a first embodiment of this invention.

With reference to FIG. 1, a color imaging apparatus includes a lens 1 and an image pickup tube 2 extending at the rear of the lens 1. The image pickup tube 2 has a yoke 3, a photoelectrical conversion target 4, a striped color filter F, and an evacuated envelope including a transparent faceplate 5. The color filter F extends between the photoelectrical conversion target 4 and the faceplate 5. The lens 1 focuses a scene of an object O on the photoelectrical conversion target 4 through the color filter F. A line-by-line rectangular raster scan of the image on target 4 allows the image pickup tube 2 to generate a color-multiplexed video signal Sm in accordance with the scene of the object O.

Figure 2:
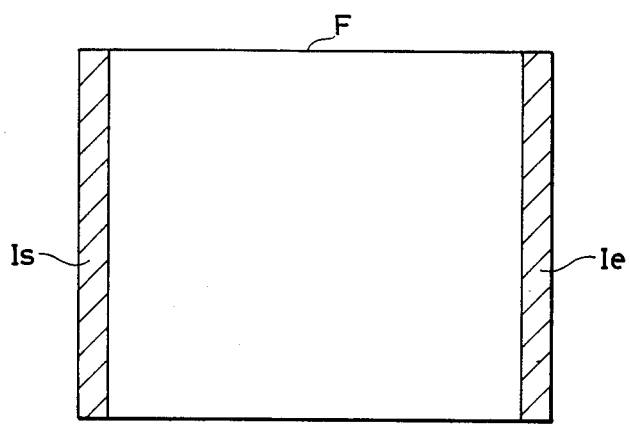
FIG. 2 is a plan view of index signal generation patterns in the color imaging apparatus of FIG. 1.

As shown in FIG. 2, the color filter F includes index signal generation patterns Is and Ie extending along vertical edges. The index signal generation patterns Is and Ie are arranged outside an image incident area but within a rectangular raster area of the electron beam. One of the index signal generation patterns can be omitted. As index signal generation patterns to be provided in a light path to the photoelectrical conversion target 4 of the image pickup tube 2, for example, the pattern of the color stripe filter F may also be used, and in this case an arbitrary color light is applied to both ends of the color stripe filter F with respect to the horizontal scanning direction as a bias light to generate index signals so that index signals can be generated from the pattern of the color stripe filter F. As examples of the previously-mentioned index signal generation pattern, for example, a white-black pattern may be provided at the starting edge of the color stripe filter F with respect to the horizontal scanning direction, a pattern may be processed and provided at the start edge of the photo-electrical conversion target 4 of the image pickup tube 2 with respect to the horizontal scanning direction, or a member for generating predetermined index signals may be disposed in a light path to the image pickup tube 2 and the optical image of a pattern provided in the member may be focused on the photoelectrical conversion target 4 of the image pickup tube 2 to generate index signals when the photoelectrical conversion target 4 is scanned by the electron beam. During a beginning of each horizontal scanning period, the electron beam scans the left-hand edge of the photoelectrical conversion target 4 corresponding to the index signal generation pattern Is and thus allows the image pickup tube 2 to generate an index signal corresponding to the pattern Is. During an end of each horizontal scanning period, the electron beam scans the right-hand edge of the photoelectrical conversion target 4 corresponding to the index signal generation pattern Ie and thus allows the image pickup tube 2 to generate an index signal corresponding to the pattern Ie.

Figure 3:
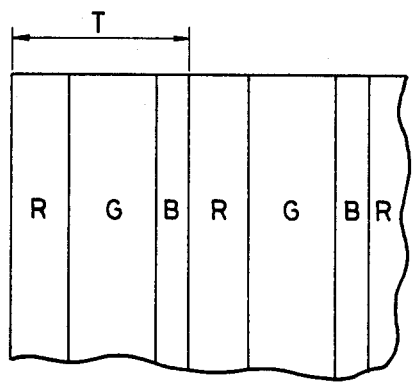
FIG. 3 is a plan view of a portion of the color filter of FIG. 1.
Figure 4:
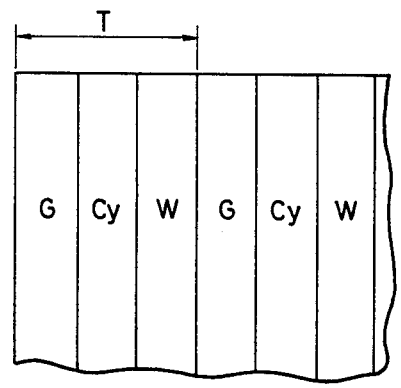
FIG. 4 is a plan view of a portion of a modified color filter.

As shown in FIG. 3, the color filter F includes successively arranged recurrent groups of vertical stripes of red (R), green (G), and blue (B). As shown in FIG. 4, the color filter F may include successively arranged recurrent groups of vertical green (G) stripes, cyan (Cy) stripes, and transparent (W) stripes. It should be noted that the color filter F may also include successively arranged recurrent groups of stripes of different colors designed in other manners. In FIGS. 3 and 4, the character T denotes a period of recurrence of color stripe groups when the color filter F is scanned by an electron beam of the image pickup tube 2.

The color-multiplexed video signal Sm contains a dc component and color signal components in the form of a carrier being modulated in frequency, phase and amplitude with the color stripe filter F. The carrier has a frequency fl inversely proportional to the period T of recurrence of color stripe groups in the color filter F. Specifically, the carrier is modulated in frequency and phase corresponding to the individual stripes of each recurrent group of the color filter F and in amplitude corresponding to the intensity of light passed through the individual stripes.

The color-multiplexed video signal Sm is applied via a preamplifier 51 to low pass filters 52 and 53, and a band pass filter 54. The low pass filter 52 has a preset cut-off frequency and allows to pass a wide-band luminance component Sy of the video signal to an output terminal 6. The low pass filter 53 has a preset cut-off frequency lower than the cut-off frequency of the low pass filter 52 and passes a lower frequency range luminance component SL of the video signal to a matrix (MTX) circuit 55. The band pass filter 54 passes the color signal component S1 of the video signal to synchronous detectors 57 and 58, a frame memory 59, and a phase shifter 60 in the form of a second color-multiplexed video signal.

As an initial calibration, a reference color imaging operation is performed before normal color image pickup operation. During the reference color imaging operation, the color imaging apparatus is directed to take a scene having substantially a uniform brightness and a color equal to one of the stripe colors of the color filter F. Specifically, a typical method is placing a color filter of the selected one of the stripe colors in the lens system and directing the color imaging apparatus toward a plain white board. The frame memory 59 is controlled to write a part of the signal S1 corresponding to at least one frame period. During the normal color image pickup operation following the initial calibration, the written part of the signal S1 is no longer updated before the next calibration, but is repeatedly read out at a rate synchronized with both the nominal horizontal and vertical scanning frequencies of a desired industry standard television system to produce a signal S2 in response to a control signal fed from a standard signal generator (not shown). The signal S2 read out from the frame memory 59 is applied to a reference signal generator or standard signal generator 61 and a phase comparator 62.

The frame memory 59 preferably includes a combination of an analog-to-digital (A/D) converter, a read/write digital memory, and a digital-to-analog (D/A) converter. The signal S1 outputted from the band pass filter 54 is changed by the A/D converter into a corresponding digital signal, which is written in the digital memory. The digital signal read out from the digital memory is changed back to the corresponding analog signal S2 by the D/A converter. The digital memory is controlled by signals whose frequencies have fixed relations to the frequencies of vertical sync pulses and horizontal sync pulses.

The signal stored in the frame memory 59 and also the signal S2 outputted from the frame memory 59 represent the carrier whose phase depends on the color of light which was applied to the color imaging apparatus during the initial calibration.

The standard signal generator 61 produces reference signals S3 and S4 on the basis of the signal S2 read out from the frame memory 59. In general, frequencies of the reference signals S3 and S4 are equal to the frequency of the carrier of the color-multiplexed video signal S1. Phases of the reference signals S3 and S4 have fixed relationships with the phase of the carrier respectively. The reference signals S3 and S4 are applied to the synchronous detectors 57 and 58 respectively.

The synchronous detectors 57 and 58 use the respective reference signals S3 and S4 in demodulating the color-multiplexed video signal S1 and deriving demodulated color signals S5 and S6 from the signal S1.

In cases where the color imaging apparatus operates in the normal color image pickup mode and the signal S2 is repeatedly produced from the frame memory 59, the synchronous detectors 57 and 58 receive the color-multiplexed video signal S1 from the band pass filter 54 and process the signal S1 through the synchronous detectors with the reference signals S3 and S4 supplied from the standard signal generator 61. The synchronous detectors derive the demodulated color signals S5 and S6 from the color-multiplexed video signal S1.

The demodulated color signals S5 and S6, and the narrow-band luminance signal SL are applied to the matrix circuit 55. The matrix circuit 55 derives primary color signals R, G, and B from the inputted signals S5, S6, and S1 and outputs the primary color signals R, G, and B to respective terminals 7, 8, and 9. As described previously, the low pass filter 52 outputs the wide-band luminance signal Sy to the terminal 6.

A composite television signal of the desired system may be created by combining the R, G, B components outputted from the matrix circuit 55, the wide-band luminance component Sy, sync and blanking signals.

The color-multiplexed video signal S1 outputted from the band pass filter 54 and stored in the frame memory 59 contains an index signal component corresponding to the index signal generation patterns Is and Ie. The output signal S2 from the frame memory 59 also contains an index signal component corresponding to the index signal generation patterns Is and Ie. The index signal component of the output signal S2 from the frame memory 59 was determined during the initial calibration and remains unchanged during the subsequent normal image pickup operation. In general, the index signal component of the signal S2 represents electron-beam scanning conditions during the initial calibration. Specifically, a phase of the index signal component of signal S2 from the frame memory 59 represents the initial start and end positions of each scanning line which occurred during the initial calibration. The start and end positions of each scanning line are detected by use of the index signal generation patterns Is and Ie respectively.

The phase shifter 60 derives a signal S7 from the color-multiplexed video signal S1 through a phase shifting process. The phase of the signal S7 advances or retards from the phase of the signal S1 by an adjustable value. The output signal S7 from the phase shifter 60 is applied to the phase comparator 62. The output signal S7 from the phase shifter 60 contains an index signal component corresponding to the index signal generation patterns Is and Ie. The index signal component of the signal S7 is periodically updated during the normal image pickup operation. In general, the index signal component of the signal S7 represents present electron-beam scanning conditions. Specifically, a phase of the index signal component of signal S7 from the phase shifter 60 represents the start and end positions of each scanning line which occur at present and which are updated periodically. The start and end positions of each scanning line are detected by use of the index signal generation patterns Is and Ie respectively.

The phase comparator 62 senses or derives the difference in phase between the signals S2 and S7. The output signal of the phase comparator 62 is sampled at the beginning or end, or both of each horizontal beam scanning period by a sample-and-hold circuit 63 and held there till next sampling to output a signal S8. The timing of the sampling is controlled by a sampling pulse signal, which is formed in a standard signal generator (not shown) on the basis of a horizontal sync signal and supplied to the sample-and-hold circuit 63 through a terminal 64. The output signal S8 from the sample-and-hold circuit 63 depends on the difference in phase between the index signal components of the signals S2 and S7 and hence is referred to as a phase difference signal. Since the index signal component of the signal S2 represents electron-beam scanning conditions during the initial calibration and the index signal component of the signal S7 represents present electron-beam scanning conditions, the phase difference signal S8 from the S/H circuit 63 depends on variations in electron-beam scanning conditions. Specifically, the phase difference signal S8 represents deviations of the present start and end positions of each scanning line from the initial start and end positions of the same scanning line. During the normal image pickup operation, the index signal component of the signal S7 is periodically updated so that the output signal S8 from the S/H circuit 63 is also periodically updated. Specifically, the phase difference signal S8 is updated in synchronism with changes of horizontal scanning periods. In case the output signal of the phase comparator 62 is sampled only at the beginning of each horizontal beam scanning period, the start position of each scanning line is indirectly detected through the detection of the end position of each scanning line.

The phase difference signal S8 is applied to a deflection control circuit 66 through a loop (low pass) filter 65, which has a time constant equal to several times the horizontal scanning period. As will be described in more detail hereinafter, the deflection control circuit 66 includes a centering adjustment section connected to a horizontal deflection coil of the deflection yokes 3 of the image pickup tube 2. A signal applied to the horizontal deflection coil is controlled in accordance with the phase difference signal S8.

As understood from FIG. 1, the image pickup tube 2, the preamplifier 51, the band pass filter 54, the frame memory 59, the phase shifter 60, the phase comparator 62, and the deflection control circuit 66 form a closed-loop phase control system. This closed-loop phase control system is designed so that the phase of the signal S7 will follow or remain essentially equal to the phase of the signal S2. As a result of the function of the closed-loop phase control system, variations in the electron-beam scanning conditions are cancelled so that the centering of the raster is kept acceptable independent of these variations. Specifically, the closed-loop phase control system allows the present start and end positions of each scanning line to follow or remain essentially equal to the start and end positions of the same (corresponding) scanning line which occurred during the initial calibration. In more detail, the phase difference between the signal S2 and S7 corresponds to a horizontal positional error component as understood from the previous description. The raster centering is corrected in accordance with the phase difference between the signals S2 and S7 so that the raster centering is kept acceptable independent of the horizontal positional error component. This correction prevents erroneous demodulations at the synchronous detectors 57 and 58 which would occur and be observable in terms of longer than the field interval resulted from such as a variation in an magnetic environment of the color imaging apparatus, or thermal deformation of the image pickup tube and the constituting components associated with the image pickup tube.

Figure 5:
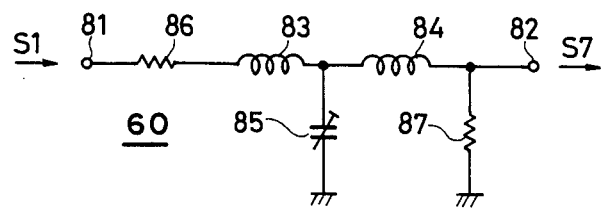
FIG. 5 is a schematic diagram of the phase shifter of FIG. 1.

As shown in FIG. 5, the phase shifter 60 includes an input terminal 81 and an output terminal 82 connected to the band pass filter 54 (see FIG. 1) and the phase comparator 62 (see FIG. 1) respectively. The phase shifter 60 includes a T-network of inductors 83 and 84, and a trimmer capacitor 85. In more detail, one end of a series combination of the inductors 83 and 84 is connected to the input terminal 81 via a resistor 86, and the other end thereof is connected to the output terminal 82. One terminal of the trimmer capacitor 85 is connected to the junction between the inductors 83 and 84, and the other terminal thereof is grounded. The output terminal 82 is grounded via a resistor 87. The phase of the output signal S7 varies relative to the phase of the input signal S1 as a function of the capacitance of the trimmer capacitor 85.

The trimmer capacitor 85 is adjusted as follows. First, a centering control signal corresponding to the output signal S8 from the phase comparator 62 is turned off or disabled and a fixed reference dc signal is applied to the centering adjustment section of the deflection control circuit 66. Secondly, the color imaging apparatus is activated under conditions where the photoelectrical conversion target 4 is exposed via the color filter F to light having a color selected from the colors of the stripes of the filter F. During this activation of the color imaging apparatus, the color-multiplexed signal S1 is written in the frame memory 59. Thirdly, the centering control signal or the phase difference signal S8 is turned on or enabled so that the raster centering control is started. Then, the trimmer capacitor 85 is adjusted so as to optimize the resulting hue while the output signals S5 and S6 from the synchronous detectors 57 and 58 or the color signals R, G, and B from the matrix circuit 55 are monitored.

Figure 6:
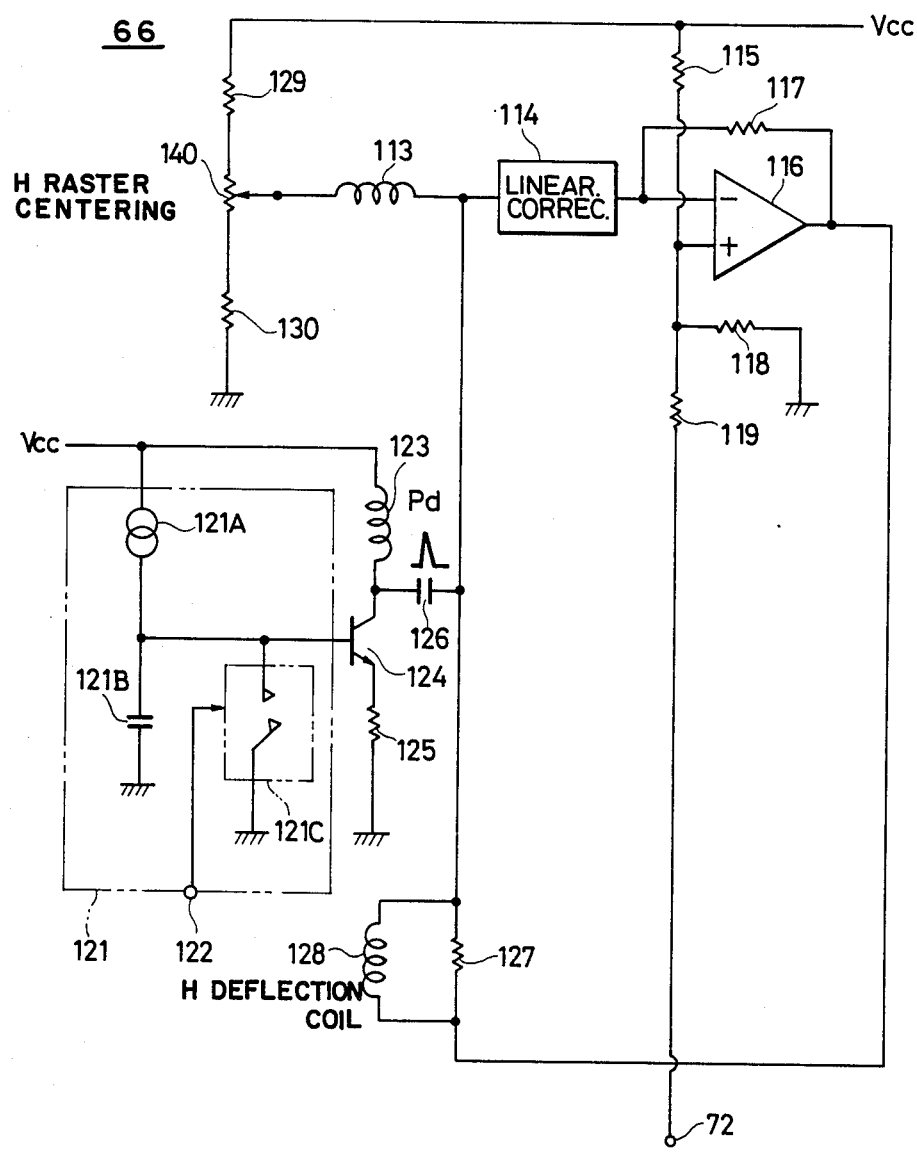
FIG. 6 is a diagram of the deflection control circuit of FIG. 1.

As shown in FIG. 6, the deflection control circuit 66 includes a triangular-wave generation circuit 121 having a constant current supply circuit 121A, a capacitor 121B, and a switching circuit 121C. The capacitor 121B is charged by a constant dc current fed from the constant current supply circuit 121A. When the switching circuit 121C is closed, the capacitor 121B is discharged. The switching circuit 121C is closed and opened in accordance with pulses applied through a terminal 122 and having a period corresponding to the horizontal scanning period. A triangular wave having a horizontal scanning period is induced across the capacitor 121B.

The triangular wave is applied to a base of a transistor 124. A collector of the transistor 124 is connected via an inductor 123 to a positive terminal of a constant voltage source Vcc. A negative terminal of the constant voltage source is grounded. An emitter of the transistor 124 is grounded via a resistor 125. The collector of the transistor 124 is connected via a capacitor 126 to a junction between a resistor 127 and an input terminal of a known linearity correction circuit 114. Deflection pulses Pd produced at the collector of the transistor 124 by differentiating the triangular wave are applied to the linearity correction circuit 114 and the resistor 127.

A series combination of fixed resistors 129 and 130, and a variable resistor 140 connected across the constant voltage source Vcc generates a direct current which is supplied via an inductor 113 to the junction between the resistor 127 and the input terminal of the linearity correction circuit 114. The direct current is adjusted in accordance with the variable resistor 140. The direct current is used in raster centering adjustment.

A deflection coil 128 of the horizontal deflection yoke 3 (see FIG. 1) is connected across the resistor 127. The horizontal deflection coil 128 is supplied with a current equal to a superposition of the centering adjustment direct current and a horizontal deflection current described hereinafter.

A non-inverting input terminal of an operational amplifier 116 is connected to the positive terminal of the constant voltage source Vcc via a resistor 115 and is grounded via a resistor 118. The non-inverting input terminal of the operational amplifier 116 is also connected to an input terminal 72 via a resistor 119. The input terminal 72 is subjected to the phase difference signal S8 (see FIG. 1) so that the non-inverting input terminal of the operational amplifier 116 receives the phase difference signal S8. The combination of the resistors 115 and 118 applies a bias potential to the non-inverting input terminal of the operational amplifier 116. An inverting input terminal of the operational amplifier 116 is connected to an output terminal of the linearity correction circuit 114 so that the inverting input terminal of the operational amplifier 116 receives an output signal of the linearity correction circuit 114. A resistor 117 is connected between the inverting input terminal and an output terminal of the operational amplifier 116. The output terminal of the operational amplifier 116 is connected to the combination of the horizontal deflection coil 128 and the resistor 127.

The operational amplifier 116 outputs the horizontal deflection current to the horizontal deflection coil 128. The horizontal deflection current depends on the output signal of the linearity correction circuit 114 and on the phase difference signal S8 (see FIG. 1). In addition, the amplitude of a dc component of the output signal from the operational amplifier 116 is determined in accordance with the bias potential applied to the non-inverting input terminal of the operational amplifier 116 by the combination of the resistors 115 and 118.

In more detail, the output signal of the operational amplifier 116 has a first component and a second component corresponding to the output signal of the linearity correction circuit 114 and the phase difference signal S8 respectively. The first component of the output signal of the operational amplifier 116 forms a normal deflection current which was subjected to a linearity correction process in the device 114. The second component of the output signal of the operational amplifier 116 forms a centering control signal which depends on and is derived from the phase difference between the signals S2 and S7 (see FIG. 1) fed to the phase comparator 62 (see FIG. 1).

Accordingly, the horizontal deflection coil 128 is driven by a current equal to a superposition of the centering adjustment current, the normal deflection current, and the centering control signal. The centering control signal depends on the phase difference between the signals S2 and S7 (see FIG. 1) which represents deviations of the present start and end positions of each scanning line from the initial start and end positions of the corresponding scanning line.

Figure 7:
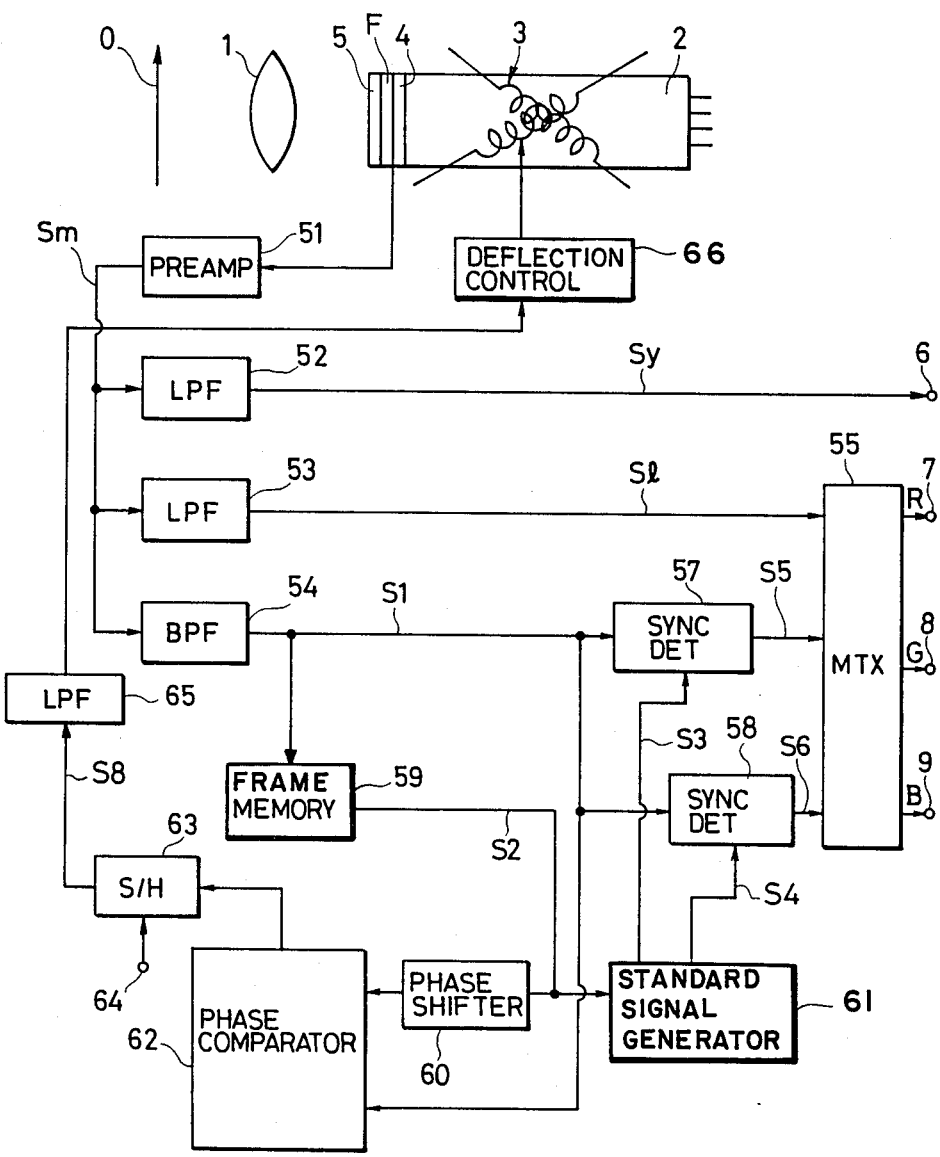
FIG. 7 is a block diagram of a color imaging apparatus according to a second embodiment of this invention.

FIG. 7 shows a second embodiment of this invention which is similar to the embodiment of FIGS. 1-6 except for the position of the phase shifter 60. In the embodiment of FIG. 7, the phase shifter 60 is connected between the frame memory 59 and the phase comparator 62 so that the phase shifter 60 acts on the output signal S2 from the frame memory 59 and the resulting phase-shifted signal is applied to the phase comparator 62. In the embodiment of FIG. 7, the color-multiplexed video signal S1 from the band pass filter 54 is directly applied to the phase comparator 62.

Figure 8:
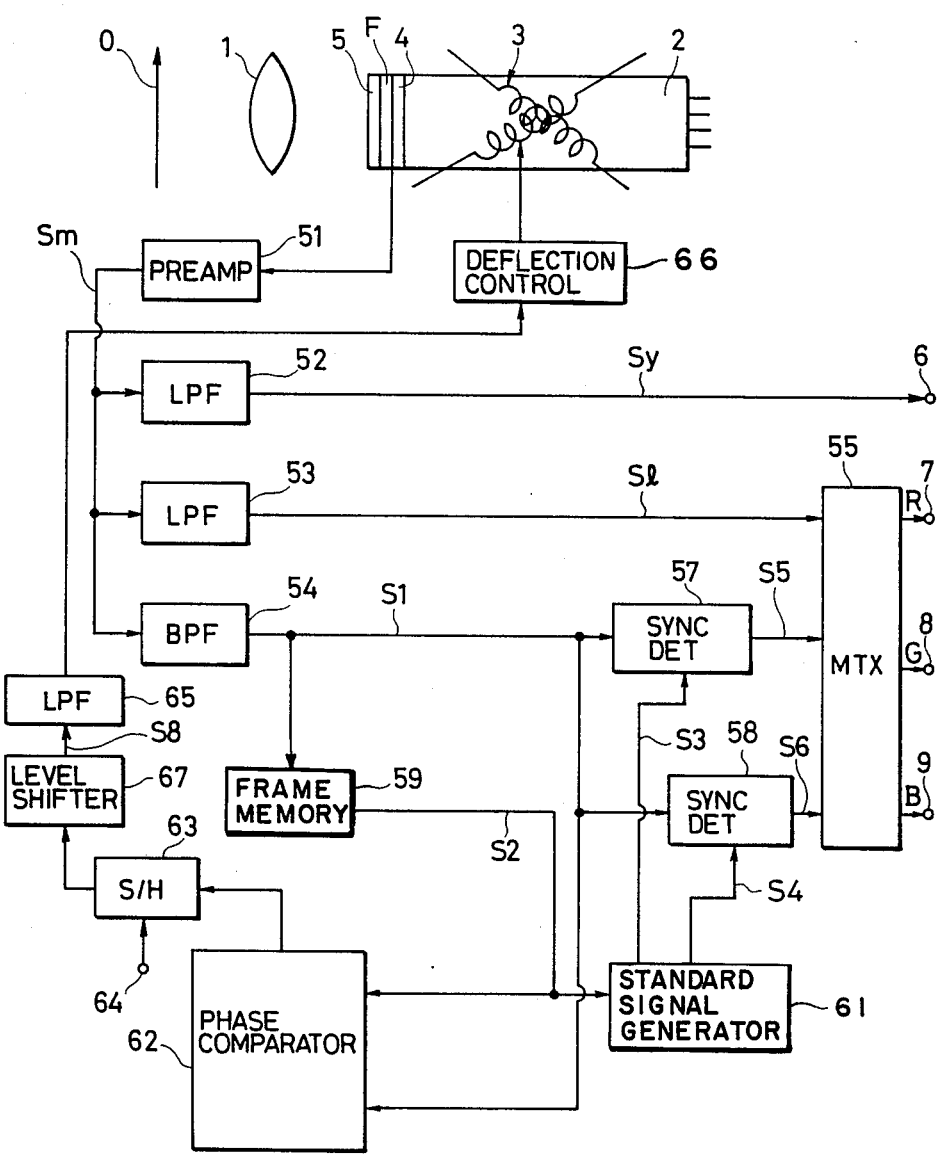
FIG. 8 is a block diagram of a color imaging apparatus according to a third embodiment of this invention.

FIG. 8 shows a third embodiment of this invention which is similar to the embodiment of FIGS. 1-6 except for using a level shifter 67 instead of the phase shifter 60. In the embodiment of FIG. 8, the level shifter 67 is connected between the sampling-and-hold circuit 63 and the loop filter 65. The level shifter 67 acts so as to add a positive or negative d.c. level to the output signal of the sample-and-hold circuit 63 and supply the resulting level-shifted signal which corresponds to the signal S8 in FIG. 1 or 8, to the deflection control circuit 66 through the loop filter 65. In the embodiment of FIG. 8, the color-multiplexed video signal S1 from the band pass filter 54 is directly applied to the phase comparator 62.

What is claimed is:
1. A color imaging apparatus comprising:
  (a) a color filter having a plurality of successively arranged recurrent groups of different color stripes;

(b) an index signal generation pattern;
(c) an image pickup tube having a photoelectrical conversion target exposed to light passing through the color filter and the index pattern, the image pickup tube outputting a video signal including a plurality of periodic frames each including a plurality of scanning lines, said video signal containing a color signal component in the form of a carrier modulated in frequency and phase in accordance with the individual color stripes of each said recurrent group of the color filter, the video signal also containing an index signal component which depends on the index pattern, the index signal component having a phase which represents a present start position of each scanning line;
(d) means for holding a portion of the video signal which occurs under a condition where the photoelectrical conversion target is exposed via the color filter to light having a color equal to the color of one of the color stripes, said held signal portion corresponding to scanning lines included in at least one initial frame period occurring during said condition, said held signal portion containing an index signal component having a phase representative of a start position of each scanning line which occurs in said initial frame period under said condition;
(e) means for repeatedly reading out the held signal portion from the holding means and outputting a first reference signal corresponding to the signal portion read out from the holding means;
(f) means for generating a second reference signal on the basis of the first reference signal, said second reference signal having a phase in a fixed relationship with the phase of the carrier of the video signal;
(g) means for detecting a color component signal from the video signal in response to the second reference signal;
(h) a closed-loop phase control system comprising means for deriving a difference in phase between the index signal component of the video signal and the index signal component of the first reference signal and thereby deriving a difference between the present start position of each scanning line and the start position of a corresponding scanning line in said initial frame period, means for deflecting an electron beam within the image pickup tube, and means for controlling the deflecting means in accordance with said positional difference and thereby allowing the present start position of each scanning line to remain essentially equal to the start position of the scanning line corresponding thereto in said initial frame period; and
(i) a signal shifting means interposed in a loop of the closed-loop phase control system.

2. The color imaging apparatus of claim 1 wherein said signal shifting means comprises a phase shifter connected between the image pickup tube and the phase-difference deriving means.

3. The color imaging apparatus of claim 1 wherein said signal shifting means comprises a phase shifter connected between the holding means and the phase-difference deriving means.

4. The color imaging apparatus of claim 1 wherein said signal shifting means comprises a level shifter connected between the phase-difference deriving means and the deflecting means.

* * * * *